P. KAEMMERER.
PHOTOGRAPHIC CAMERA.
APPLICATION FILED SEPT. 1, 1908.
989,784.
Patented Apr. 18, 1911.
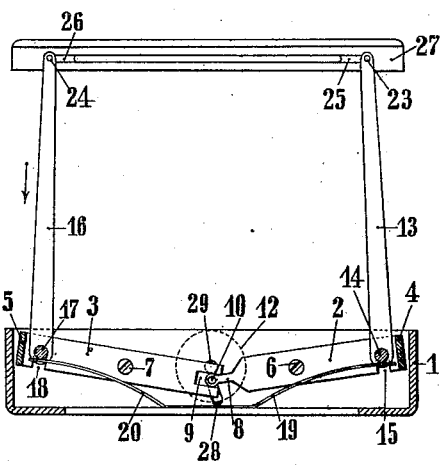
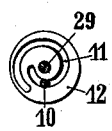
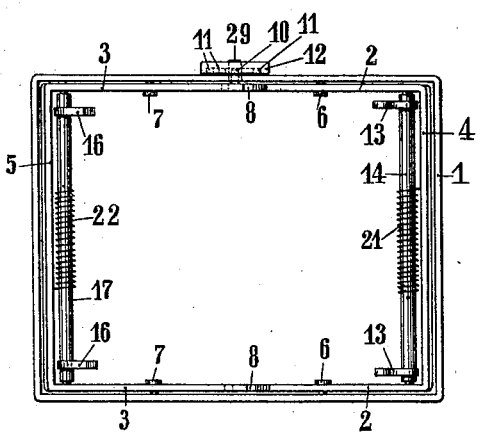
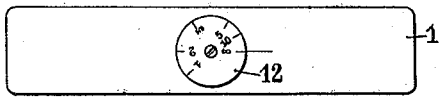

UNITED STATES PATENT OFFICE.

PAUL KAEMMERER, OF STEGLITZ, NEAR BERLIN, GERMANY, ASSIGNOR TO OPTISCHE ANSTALT C. P. GOERZ AKTIENGESELLSCHAFT, OF FRIEDENAU, GERMANY.

PHOTOGRAPHIC CAMERA.

989,784. Specification of Letters Patent. Patented Apr. 18, 1911.

Application filed September 1, 1908. Serial No. 451,254.

*To all whom it may concern:*

Be it known that I, PAUL KAEMMERER, engineer, a citizen of the German Empire, residing at 5 Holsteinischestrasse, Steglitz, near Berlin, Germany, have invented certain new and useful Improvements in or Relating to Photographic Cameras, of which the following is a specification.

My invention consists in improvements in or relating to photographic cameras of which the front and back frames are connected to one another by rigid stays.

The invention has in view the provision of an improved focusing device by which the objective is adjusted from the film or plate carrier in accordance with the distance of the object to be photographed. For this purpose the joints of the stays in the camera box are arranged in bearing pieces movable in the direction of the optical axis so that by displacement of these bearing pieces which remain permanently in the camera box, the distance between the objective and the plate carrier can be adjusted according to the distance at the time being of the object to be photographed.

The invention is illustrated in the annexed drawing in which—

Figure 1 is an axial section of the improved camera. Fig. 2 a section through the camera perpendicular to the axis of the objective. Fig. 3 shows the back of the focusing disk. Fig. 4 is a plan of the wall of the camera box carrying the focusing disk.
The camera box is indicated by 1. In this box are two lever pairs 2, 2 and 3, 3 of which the first pair are connected together by a connecting piece 4 and the latter pair by a connecting piece 5, the pairs being rotatable on pivots 6, 6 and 7, 7. The levers of the lever pair 2, 2 extend with their contracted ends 8, 8 into recesses 9, 9 of the lever pair 3, 3 so that a turning movement of the one pair causes corresponding rotation of the other pair. The reduced end of one of the levers 2 carries a pin 10 which projects through the wall of the box and engages in a spiral groove 11 of the focusing disk 12 which is seated on the outside of the box.
To the lever pair 2, 2 a pair of stays 13, 13 is attached by means of a spindle 14 which rests in recesses of the lever pair 2. Opposite the pair of stays 13 is a pair of stays 16 which are seated on a spindle 17 which lies in a recess 18 of the lever pair 3.
Springs 19, 20 are arranged which tend to push the spindles 14 and 17 into the recesses 15 and 18. Coil springs 21 and 22 tend to hold the stays 13 and 16 in the position shown in Fig. 1. The stay pairs 13 and 16 engage by means of pins 23, 24 in slots 25 and 26 of the back or plate carrier 27 of the camera.

28 is a slot in the box wall in which the pin 10 extending through the wall is laterally movable, the slot being substantially covered by the focusing disk rotatable about the pivot 29.

The action of the apparatus is as follows: Let it be assumed that the camera is in its working position shown in Fig. 1 and that it is desired to adjust the focus to a certain distance. For this purpose the disk 12 is rotated causing the pin 10 to move in the groove 11 and rotate the two lever pairs 2, 2, 3, 3 about the pivots 6, 6 and 7, 7. This rotation of the lever pairs produces displacement of the spindles 14 and 17 since the said spindles being permanently held by the springs 19 and 20 in abutting position in the recesses 15 and 18 must take part in all movements of the lever pairs 2, 2 3, 3. The rotation of the lever pairs 2, 2 3, 3 thus produces longitudinal displacement of the stay pairs 13 and 16 and moves the plate frame 27 to or from the camera box which carries the objective, not shown in the drawing.

Having now particularly described and ascertained the nature of my said invention and in what manner the same is to be performed, I declare that what I claim is:

1. In a photographic camera a casing, a frame, single pieced rigid stays, bearing members for said stays mounted in said casing and adjustable substantially in the direction of the optical axis of the camera the stays pivotally connected to said bearing members and when in operative position holding said frame a definite distance away from said casing said distance depending on the adjustment of said bearing members within the casing toward or away from said frame.

2. In a photographic camera a casing, a frame, single pieced rigid stays adapted to hold said frame a definite distance away from said casing, adjustable pivoted levers mounted in said casing and forming bearings for the pivots of said stays the bearing forming levers being so interconnected that on moving the levers all the pivots of the stays are moved simultaneously with the same velocity substantially in the direction of the optical axis of the camera.

3. In a photographic camera a casing, a frame, a pair of levers pivotally mounted within said casing so as to have their free ends moving substantially in the direction of the optical axis of the camera the lever ends turned toward each other being coupled together, single pieced rigid stays pivotally mounted within said levers at their outer ends and adapted to hold said frame at a definite distance away from said casing, and a rotatable adjusting member mounted in said casing having a spiral groove engaging said coupled bearing forming levers and adapted to adjust the member engaging said groove in the direction toward and away from said frame, so as to allow controlling of the distance of said frame from said casing by means of said stays.

In testimony whereof I have signed this specification in the presence of two subscribing witnesses.

PAUL KAEMMERER.

Witnesses:
  WOLDEMAR HAUPT,
  ARTHUR SCHROEDER.

Copies of this patent may be obtained for five cents each, by addressing the "Commissioner of Patents, Washington, D. C."